July 20, 1965 — L. TRITSCH — 3,196,195
METHOD OF PRODUCING TEARABLE LAMINATES
Filed Oct. 12, 1961

INVENTOR.
Ludwig Tritsch
BY
Robt. D. Chodera 3,196,195
METHOD OF PRODUCING TEARABLE
LAMINATES
Ludwig Tritsch, Niles, Ill., assignor to The Kendall Company, Boston, Mass., a corporation of Massachusetts
Filed Oct. 12, 1961, Ser. No. 144,764
4 Claims. (Cl. 264—171)

This invention relates to the production of laminates of films or sheets of oriented, linear, crystalline polyalkenes and low density polyethylene films or sheets which can be heat sealed to themselves at lower temperatures than the oriented, linear crystalline polyalkene films, and the utilization of the same as packaging and wrapping materials. As a particular feature, this invention relates to the production of unidirectionally tearable laminates which can be heat sealed to themselves and retain their unidirectional tearing characteristic in the heat sealed portion. In particular, this inventiton encompasses fusion lamination of one or more films of a molecularly oriented, linear crystalline polyalkene and one or more films of low density, substantially non-linear polyethylene, either molecularly oriented or unoriented, and the utilization of the same in the aforesaid manner.

It is known that ethylene can be polymerized to produce, in general, two types of polymers depending upon the conditions of temperature and pressure and the nature of the polymerization catalysts used in the polymerization process. The basic difference distinguishing between one type of polyethylene and the other is the linearity of the molecules, the linearity being related to the side chain branches existing in the molecules. The type of polyethylene which first became commercially available contains a considerable amount of side chains; this type of polyethylene is substantially non-linear and is characterized by a melting point and an average density lower than the melting point and average density of the second type which subsequently became commercially available. The first type of polyethylene generally melts in the range of about 212° to about 240° F., has an average density of about 0.92, and has side chain branching occurring in the proportion of about one side chain per 20 carbon atoms in the main polymer chain. The second type of polyethylene melts in the range of about 260° to 275° F., has an average density greater than about 0.92, the density ordinarily ranging from about 0.95 to about 0.98 in its annealed state, and a degree of side chain branching of about one-tenth and less than the side chain branching occurring in the first type of polyethylene. The two types of polyethylenes and representative processes for their preparation are illustrated in U.S. Patents 2,153,553 and 2,816,883.

The first type of polyethylene is therefore substantially non-linear as compared to the second type of polyethylene. The degree of side chain branching, including cross-linking which may occur in the first type of polyethylene, interferes with the packing of the polymer chains in a crystalline arrangement. Accordingly, the two types of polyethylene are further distinguishable from each other in the degree of crystallinity. The amount of crystallinity which the first type of polyethylene can develop is comparatively low, usually limited to about 50–60% and ordinarily ranging from about 30 to 60%. In contrast, the second type of polyethylene develops a higher amount of crystallinity, for example, crystallinities from 80% to above 90% have been observed.

Since the advent of the commercial availability of the second type of polyethylene, the first type has become identified by those in industry as low density polyethylene and also has been referred to as conventional polyethylene. The second type of polyethylene has been variously referred to as the high density, or linear, or low pressure polymer. See, for example, Kresser, "Polyethylene," Reinhold Publishing Corporation, New York (1957). These terms will be used herein in the same manner as used in industry to identify the two types of polyethylenes and to distinguish one from the other. As is commonly understood, high density or linear polyethylenes are polyethylenes which have a higher density, higher melting point, less side chains in the main polymer chain, and a greater amount of crystallinity than the low density or conventional polyethylene, the high density polyethylenes being distinguishable from the low density polyethylenes by such physical properties as greater stiffness, greater hardness, higher tensile strength, lower gas permeability and vapor transmission, and greater abrasion resistance.

Other alkenes which can be polymerized into highly linear solid polymers are the alpha-alkenes such as propylene and alpha-butene. The isotactic, linear polypropylene and poly-alpha-butene polymers also exhibit a high degree of crystallinity, and in this respect are more analogous to the high density polyethylene than the low density polyethylene. Thus, for example, linear, crystalline polypropylene exhibits greater stiffness, hardness and abrasion resistance than either low or high density polyethylene. The atactic polypropylene, although linear, is amorphous and is more like rubber in its elastic properties. Commercial, linear, crystalline polyalkenes also include copolymers of the aforementioned monomers and these monomers with others, wherein the copolymeric constituent does not interfere with close packing of polymer molecules necessary to give high crystallinity.

It is generally understood that molecular orientation in the crystalline polyalkene films improves tensile strength of the films in the direction of molecular orientation. As used herein, the terms "molecular orientation," "molecularly oriented," or their equivalent, mean unidirectional orientation wherein the polymer molecules or molecular aggregates, or some proportion thereof, in the film are oriented or arranged with respect to each other in a substantially common direction within the plane of the film. In molecularly unoriented film the molecules or molecular aggregates are believed to exist in a comparatively random relationship to each other and have no predominantly common direction. The molecularly oriented films are highly suitable for use as protective wrapping and packaging materials.

Films of molecularly oriented, linear, crystalline polyalkenes are comparatively easy to tear in the direction of orientation. For example, molecular orientation can impart even paper-like tearability to thin, linear, polyethylene films in the direction of molecular orientation. Moreover, the linear, crystalline, molecularly oriented films are tearable in a straight line without substantial deviation from the direction in which the tear is initiated. It is practically impossible to tear molecularly oriented, linear, highly crystalline films in a straight line transverse to the direction of orientation, even when the tear in the transverse direction has been initiated by cutting. An oriented, linear, high density polyethylene film generally splits upon application of a tearing force, the split occurring in a direction parallel to the line of orientation.

Molecularly oriented, low density polyethylene films exhibit tearing characteristics substantially different from molecularly oriented, linear, crystalline polyalkenes. The differences are substantial even though the polymers are derived from the same monomer, as may be illustrated in the case of ethylene polymers. Thus, molecular orientation reduces the tear resistance of the low density polyethylene film to some extent in the direction of orientation, but even then, however, the film is relatively difficult to tear. Generally the low density polyethylene film exhibits a tear resistance several times greater than the tear resistance of a similarly oriented high density, crystalline polyethylene film. Moreover, the tear is difficult to initiate in the oriented, low density film and the tear does not ordinarily proceed in a straight line. The tearing action produces a "necking-down" of the film at the point of tear thereby deforming the film, the tear proceeding in a somewhat unpredictable direction.

As a specific illustration, a laminate of molecularly oriented, high density, linear, crystalline polyethylene film and a low density polyethylene film, whether or not molecularly oriented, surprisingly exhibits tearing characteristics similar to that of the molecularly oriented, high density polyethylene film itself. The laminate is unidirectionally tearable, that is, it can be torn in a continuous straight line in the direction of orientation in the same manner as the single ply of the high density polyethylene film. Tearing of the laminate is not accompanied with the "necking-down" and deformation usually associated with the low density film under similar tearing conditions. The tear resistance of the laminates of this invention in the direction of orientation can be considerably less than the tear resistance of a similarly oriented low density polyethylene film of the same thickness and the laminate may even have a tear resistance in the direction of orientation more characteristic of the high density, crystalline film that a low density film of the same thickness. Laminates can be prepared in accordance with this invention which assume the characteristics of a single ply of molecularly oriented, linear polyalkene film in these respects and which further do not exhibit the tendency to split when a tearing force is applied to the laminate in a direction transverse to the direction of the molecular orientation.

As indicated previously, the low density polyethylene film or lamina may be molecularly oriented or molecularly unoriented. In some instances the tear strength of the low density polyethylene lamina may be so greatly reduced by the film of molecularly oriented, high density, crystalline polyethylene, crystalline polypropylene or crystalline poly-alpha-butene that any additional reduction due to orientation in the low density lamina may not be of any practical, measurable difference. However, if the low density polyethylene lamina is molecularly oriented, alignment of this lamina with the direction of molecular orientation therein the same as the direction of molecular orientation in the linear, crystalline polyalkene lamina, will give the greatest ease of unidirectional tearability.

The laminates are highly suitable for packages which can be sealed along its marginal edges and which can be tear-opened by tearing the marginal edge in a direction parallel to the line of orientation. A particularly advantageous feature of this invention is that the laminates can be fabricated into packages by heat sealing along the marginal edges of the laminates without substantial loss of the ease of tearability of the laminates in the sealed edge. This can be accomplished by heat sealing the laminae constituting the panels of the package with the low density polyethylene surfaces in face-to-face contact at a temperature which does not substantially reduce the molecular orientation in the linear, crystalline polymers, thereby preserving the easy and unidirectional tearability of the laminates.

Various methods may be used to produce the film suitable for forming the laminates. Conventional methods for forming films from thermoplastic materials include such methods as casting, extruding and calendering. All of these methods are capable of producing films of various thicknesses in an unoriented or substantially unoriented state. These preformed, unoriented films may be laminated in the conventional manner of laminating thermoplastic films, for example, by heat and pressure laminating techniques. The temperature maintained in the laminating step must be sufficiently high to fuse the films together at the interface between the films. The temperature, of course, is largely dependent upon the pressure employed and the degree of fusion bonding obtained is dependent upon a correlation of temperature, pressure and the dwell time during which the films are subjected to the elevated temperatures and pressures. The laminate may then be subsequently conditioned and drawn to impart molecular orientation to the laminae. Care must be exercised when molecularly orienting the films after they have been laminated in order to avoid rupturing the bond at the interface between the films. It is primarily for this reason that adhesive lamination of preformed, unoriented films is not to be recommended. Satisfactory laminates of this invention may be produced by adhesive lamination if the film of high density polyethylene, crystalline polypropylene, or crystalline poly-alpha-butene is oriented prior to lamination. In this case, the low density polyethylene film may also be molecularly oriented, if desired. Generally, however, fusion bonding between the laminates is preferred because of the strength of such bond and because it avoids the introduction of a third or intermediate component in the laminated structure.

Fusion lamination of preformed films of the molecularly oriented, linear, crystalline polyalkenes to preformed, low density polyethylene films, either oriented or unoriented, requires careful correlation and control of temperature, pressure, and dwell time in order to preserve the orientation in the linear, crystalline polyalkene films. If the orientation in the crystalline polyalkene film is destroyed while applying heat and pressure during lamination, the laminate will no longer exhibit the tear strength and unidirectional tearing characteristics to be obtained in accordance with this invention. Present commercially available high density polyethylenes exhibit a rapid change in viscosity over a very narrow temperature range, generally from 290° to 300° F. Accordingly, heat and pressure lamination of such preformed oriented films requires careful control in order not to destroy or substantially reduce the orientation in the preformed high density polyethylene film or to deform the film.

Although laminates may be made from preformed sheets or films and then reheated in the step of fusion lamination, as explained, the laminates preferably are produced by a calendering operation wherein the films are formed directly from bulk materials and the crystalline, linear polyalkene films and the low density polyethylene films are molecularly oriented and laminated in a continuous single pass through a calendering apparatus. By this process it is possible to obtain a laminate wherein the individual laminae are fused together while the laminae are still in a softened condition after formation thereof. Advantageously, this calendering process eliminates separate orientation treatments either prior or subsequent to formation of the laminate. This method will now be specifically described in illustration of the invention with reference to the drawings, in which:

Figure 1:
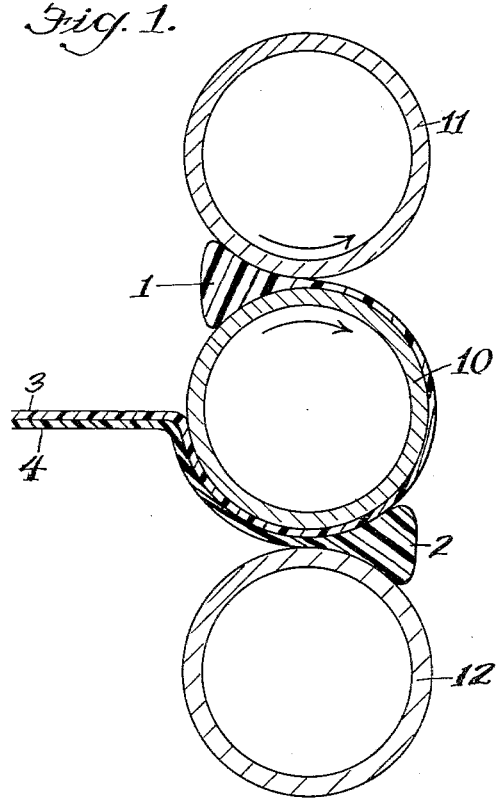
FIGURE 1 is a schematic diagram of a three roll calender by which the process of this invention may be practiced.

For purposes of illustration, the production of a six mil laminate composed of three mil, high density, linear, crystalline polyethylene and three mil, low density polyethylene laminae will be explained with specific reference to FIGURE 1. The high density polyethylene had a density of 0.96 and a melt index of 0.9. The low density polyethylene had a density of 0.915 and a melt index of 2.5. Separate batches of the high and low density polyethylenes were worked on a heated two roll mill at a temperature of about 340° F. until the polyethylene batches were in a molten condition. While the polyethylenes were being worked in this manner, the rolls of the calendering machine were brought up to the desired operating temperature. The top roll 11 and the bottom roll 12, as viewed in FIGURE 1, were heated to about 340° F. The center roll was maintained at about 240° F. The two rolls 11 and 10 were adjusted so as to provide a nip spacing conforming to a three mill thick film. The distance between rolls 12 and 10 was adjusted so as to provide a nip spacing conforming to a six mil thick laminate. The bulk of high density polyethylene 1 was deposited at the top nip between rolls 10 and 11. The middle roll 10 was rotated at a speed of about four yards per minute and the top roll 11 was rotated at a slower speed of about two feet per minute. The direction of rotation is indicated by the arrows.

The film emerging from the nip between rolls 10 and 11 adhered to the center roll 10 and passed through the second nip between rolls 10 and 12, after which it was then stripped from the center roll. The bulk of low density polyethylene 2 was then deposited at the second nip between rolls 10 and 12. The roll 12 was maintained stationary. The low density film is formed at this nip directly against, adhered and fused to the surface of the film of the linear polyethylene as it emerged from this second nip. The composite of the two films was stripped from the center roll 10 as a laminate of the two films. Since differential speeds were maintained between the surface of the center roll 10 and the surfaces of the top and bottom rolls 11 and 12, molecular orientation in the longitudinal direction was imparted to both the high density and the low density laminae. This principle of molecularly orienting a single ply film concurrent with formation of the film directly from bulk thermoplastic material is disclosed in U.S. Patent 2,631,954. The film thus produced consists of a six mil laminate of molecularly oriented, high density linear, crystalline polyethylene lamina 3 fusion bonded to a molecularly oriented, low density, substantially non-linear polyethylene lamina 4, wherein each of the laminae is approximately three mils thick. The direction of orientation is the same in each of the laminae.

Laminates having a crystalline polypropylene lamina or crystalline poly-alpha-butene lamina substituted for the high density polyethylene lamina can be made in the same manner described above but at higher temperatures for rolls 11 and 12. The higher softening points of these polymers necessitate higher calendering temperatures. In the case of polypropylene, for example, a top roll temperature of about 400–425° F. or above and a center roll temperature of 300° F. may be used.

A series of laminated films were produced with the same polyethylenes under the same conditions described above, except that the nip spacings were varied to change the respective thicknesses of the high density polyethylene laminae and the low density polyethylene laminae. The total thickness of each of the laminated films was about six mils, the thickness of each of the high and low density laminae varying from about 1 to 5 mils. These films and their tear strengths in the direction of orientation and transverse to the direction of orientation are tabulated below as Examples A through E. For purpose of comparison, the tear strengths of 4 mil thick single ply films of high density and low density polyethylenes are included in the table as Examples F and G. These single ply films are calendered, molecularly oriented films which were calendered in the same manner as the first laminae of the laminated films. A sample of each of the films of Examples A through E was heat sealed to itself with the low density laminae in face-to-face contact. A sample of each of the films of Examples F and G was also heat sealed to itself. In all cases, the portions to be heat sealed were arranged with the direction of orientation the same. The tear strengths of each of the films in the area of the heat seal in the direction of orientation are also tabulated below.

The tear strength was measured in accordance with the method standardized for testing the tear strength of paper, as described in ASTM designation: D689–44. This test determines the internal tearing resistance of the film by measuring the average force required to tear a single sheet after the tear has been initiated at the edge thereof. In general, the procedure followed was to insert a strip of the laminate into a pair of clamps of an Elmendorf Tearing Tester. One of the clamps is free to move independently of the other with the film held in the clamps and the clamps initially held in exact parallel alignment. The laminated film is cut at the bottom edge in the space between the two clamps. The one clamp is then permitted to swing free in a pendulum action to tear the laminate along the line initiated by the cut. The resistance of the laminates to the tearing action is measured in grams.

| Examples | A | B | C | D | E | F | G |
|---|---|---|---|---|---|---|---|
| Thickness of Films (mils): | | | | | | | |
| Low Density | 5 | 4 | 3 | 2 | 1 | | 4 |
| High Density | 1 | 2 | 3 | 4 | 5 | 4 | |
| Total Thickness of Laminate | 6 | 6 | 6 | 6 | 6 | 4 | 4 |
| Total Thickness of Heat Sealed Portion | 12 | 12 | 12 | 12 | 12 | 8 | 8 |
| Tear Strength (grams): | | | | | | | |
| In Direction of Orientation | 69 | 32 | 24 | 16 | 16 | 93 | 350 |
| Transverse to Orientation | 96 | 101 | 176 | 251 | 560 | (¹) | 459 |
| Through Heat Sealed Portion | 272 | 128 | 96 | 88 | 88 | 176 | 1,312 |

¹ Splits in direction of orientation.

As shown, all of the laminated films even in the area of the heat sealed portion are more easily tearable in the direction of molecular orientation than is the 4 mil single ply, low density film of Example G and the heat sealed portion thereof. In addition, the laminates do not exhibit the tendency, as does the single ply, high density film, to split when a tearing force is applied to the film in a direction transverse to the orientation direction. Each of the laminates of Examples A through E and their heat sealed portions were tearable in a straight line in a manner similar to the molecularly oriented, high density crystalline polyethylene single ply film and its heat sealed portion. The molecularly oriented, low density polyethylene film and its heat sealed portion could not be torn in a continuous straight line and exhibited the tearing characteristics previously described. It is understood, of course, that the tear strength values in the above table are not absolute values of the resistance of all films of this invention to tearing, but, instead, are indicative of the order of magnitude of the force which may be required to tear a single ply low density molecularly oriented film and a single ply high density molecularly oriented film and the force which may be necessary to tear a laminate of this invention incorporating similarly oriented low density and high density polyethylene laminae. Aside from the order of magnitude of the tear resistance of the laminates, above described to illustrate this invention, the tearing characteristic of primary significance common to all laminates of this invention is the unidirectional or straight line tearability of the laminates. It should be understood that the tear resistances of the laminates are dependent upon such factors as the relative thicknesses of the laminae and the conditions under which the laminae are formed, oriented and laminated together.

The samples were sealed by a conventional thermal impulse heat sealer apparatus wherein each sample was inserted between a pair of bars, one of which is heated by a discharge of an electrical current through the bar when the two bars are clamped upon the sample. The samples were released from between the bars immediately after the discharge of the electrical current. For each of the samples of the material of Examples A–E and G the sealer apparatus was set for a duration of discharge, and hence dwell time, sufficient to heat seal the low density polyethylene film of Example G. In the case of the high density polyethylene film of Example F, it was necessary to double the setting of the heat sealing apparatus to increase the duration of the heating discharge of electrical current and to subject the sample to a second treatment before a firmly bonded heat sealed portion was obtained. The tear strengths of the heat sealed portions of the examples illustrate that the high density, crystalline polyethylene laminae were still molecularly oriented after heat sealing, and that the molecular orientation in the low density film was substantially changed. This is further shown by the unidirectional tearabiilty of the heat sealed portions of Example A–E.

The advantages of this invention are also realized with laminates having more than two laminae. It is essential, however, that at least one of the laminae be a film of molecular oriented, linear, crystalline polyalkene as noted above. As stated previously, the low density polyethylene lamina may be either oriented or unoriented. If more than one of the linear, crystalline polyalkene laminae are molecularly oriented then all such laminae must be arranged with the orientation in the same direction.

Figure 2:
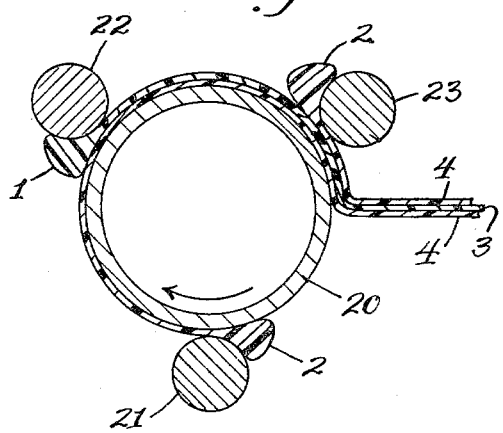
FIGURE 2 is a schematic diagram of an apparatus for calendering three ply laminates.

A suitable method for the production of a three ply laminate wherein the middle lamina is a molecularly oriented, high density, crystalline polyethylene will be described with reference to FIGURE 2. Rolls 21, 22 and 23 are maintained at a temperature about or above the melting or softening points of the bulk polyethylene placed at the nips formed by these rolls and roll 20. The roll 20 rotates in the direction indicated by the arrow in the drawing and is maintained at a temperature below that of the three other rolls. Since the high density lamina is to be the middle lamina, this lamina will be formed at the nip between rolls 20 and 22. In order to molecularly orient the polyethylene, a speed differential is maintained between the surface of roll 20 and the surface of roll 22. This may be accomplished by holding roll 22 stationary or rotating it at a rate of speed slower than that of roll 20. Because of the relative viscosity characteristics of the two types of polyethylene, it is preferable to operate with a rotating roll 22 in order to reduce the frictional forces occurring between the two laminae while the second lamina of high density polyethylene is being formed and fused onto the surface of the first-formed low density polyethylene lamina. The viscosity and/or cohesive strength of low density polyethylene is less than that of high density polyethylene and therefore presents some difficulty in properly fusion laminating the second lamina of high density polyethylene onto the low density lamina without extrusion and deformation of the low density lamina. This tendency towards extrusion or deformation may be eliminated or minimized to an inconsequential degree by proper control and correlation of operating temperatures and relative speeds of the rolls, for example, by reducing the temperature of roll 20 for a given rate of differential speeds, but preferably not below the temperature at which the surface of the first lamina is so hardened that it cannot adequately fuse with the high density polyethylene at the nip between rolls 20 and 22 except by raising the temperature of roll 22 to an impractically high temperature.

If necessary, the low density polyethylene can be blended with fillers, fibers or pigments for the purpose of improving the strength and imparting the necessary properties to the lamina to overcome any tendency toward extrusion or deformation. Alternatively, if the viscosity of the high density polyethylene is such that it is difficult to calender directly onto the low density polyethylene lamina formed at the nip between rolls 20 and 21, it may be desirable to first form the high density polyethylene lamina at a nip between roll 22 and another adjacent roll, not shown, and then carrying the lamina so formed on the surface of roll 22 into the nip between roll 20 and 22 and into pressure contact with the surface of the previously formed low density lamina carried on the surface of roll 20. In this instance, the temperature of roll 22 and the adjacent roll should be maintained at about the melting point of the high density polyethylene and the surface speeds of rolls 20 and 22 may be the same. The adjacent roll may be kept stationary or may rotate at a slower rate of surface speed than roll 22 to impart molecular orientation to the high density lamina. The same general principles of operation are also applicable to produce laminates wherein the middle lamina is either crystalline polypropylene or crystalline poly-alpha-butene.

The first lamina of the low density polyethylene is obtained by first depositing a molten bulk of low density polyethylene, 2, at the nip between rolls 20 and 21. The film or polyethylene emerging from this nip is adherent to the cooler surface of roll 20 and passes through both of the nips formed by rolls 20 and 22 and by rolls 20 and 23, respectively. After the film emerges from the third nip it is stripped from the surface of roll 20. The spacing between the surface of roll 22 and the surface of the first lamina is adjusted so that the nip gap conforms to the desired thickness of the two ply laminate which is to be formed at this nip. A molten bulk of high density polyethylene, 1, is then deposited at this nip. A layer of unidirectionally molecularly oriented high density polyethylene is formed at this nip on the thermally softened surface of the first lamina and emerges fused to the first lamina. The two ply laminate is thus continuously formed and carried through the nip between rolls 23 and 20. The spacing between the surface of roll 23 and the surface of the high density lamina is adjusted so as to conform to a three ply laminate of the desired thickness. Another molten bulk of the low density polyethylene, 2, is deposited at the nip between these two rolls. The layer formed at this nip emerges therefrom as a lamina fusion bonded to the thermally softened surface of the high density polyethylene lamina, thereby producing a three ply laminate with the high density lamina 3 sandwiched between two low density polyethylene laminae, 4, 4. As indicated, differential speeds are maintained at least between the surface of roll 22 and the surface of roll 20 so as to molecularly orient at least the high density polyethylene lamina. If the surface speeds of the rolls 20, 21 and 23 are substantially the same, the low density polyethylene laminae will be substantially unoriented. Laminates of this type also exhibit the desired tearability characteristics as explained above.

Figure 3:
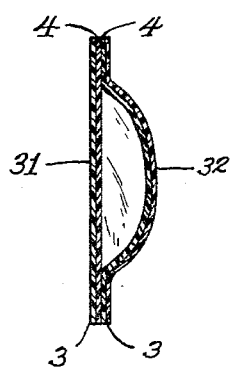
FIGURE 3 is a cross-sectional view of a package made with laminates produced in accordance with this invention.
Figure 4:
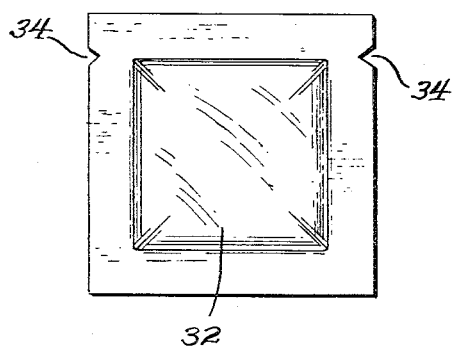
FIGURE 4 is a planar view of the package shown in FIGURE 3.

FIGURE 3 is a cross-sectional diagram of a heat sealed package having a back panel 31 and a front panel 32 consisting of two ply laminates prepared in the manner described with reference to FIGURE 1, and wherein both panels are sealed together along its outer margins with the laminae of the low density polyethylene 4, 4 of each panel in face-to-face contact. The outer surface of the package consists of the high density, molecularly oriented polyethylene laminae 3, 3. The panels 31 and 32 are arranged so that the direction of molecular orientation is the same in the high density laminae 3, 3 of each of the panels. The marginal edges were sealed in the same manner as described above. The sealed marginal area may be torn in the direction of molecular orientation in the high density, crystalline polyethylene laminates to easily open the package for access to the contents thereof. The outer edge of the sealed marginal area may be notched, or otherwise suitably marked, in the direction of molecular orientation to identify the direction in which the sealed edge may be torn for easy opening, as shown in FIG. 4. FIG. 4 is a planar view of the package of FIG. 3, viewing toward the front panel 32, showing a pair of notches 34, 34 located at the edges of the package. The notches are directed parallel to the orientation in the high density laminae of the panels.

Heat sealed low density polyethylene packages having an easy and unidirectional tear-opening edge have heretofore been unknown. It is possible to effect a heat seal between the two laminated films at temperatures below that which will substantially reduce the molecular orientation in the high density polyethylene laminae and below temperatures which may deform the high density lamina during the heat sealing operation, when the low density laminae are in face-to-face contact. These heat seals display lower resistances to tearing than do heat seals with the high density laminae in face-to-face contact.

For the structure shown in FIGS. 3 and 4 the heat sealing temperatures may vary in the range between about the softening point of the low density polyethylene and about the softening point of the high density polyethylene when the low density polyethylene laminae are to be sealed together. In this case, it is possible to accomplish heat sealing at temperatures as low as about 225° F. without necessitating excessively long dwell times. The length of dwell time, of course, will be dependent upon the temperature and pressure of the heat sealing operation. Generally, more drastic conditions are necessary to effectively heat seal the laminates with the high density polyethylene laminae in face-to-face contact, as indicated by the conditions employed in heat sealing the high density film of Example F, and require careful control thereof because of the viscosity characteristics of the high density polyethylene at high temperatures.

Heat sealing conditions which destroy the molecular orientations in the high density polyethylene laminae are to be avoided in order to realize the advantages of this invention. The application of a tearing force in any direction to a heat sealed, unoriented area causes deformation of the film and stretching at the point of the tear. After sufficient stretching of the polyethylene film, rupture within the film occurs, producing a jagged and uneven opening in the package.

Similar considerations are also applicable to heat sealable packages wherein the outer laminae of the package is crystalline polypropylene or crystalline poly-alpha-butene. The heat sealing temperature need not exceed the softening point of the low density polyethylene if the package is formed with the low density lamina facing into the package.

It is to be understood that packages made with the laminates of this invention can be sealed by means other than heat sealing techniques, provided that the other sealing techniques do not destroy the orientation in the linear, crystalline polyalkene lamina and further provided that the panels are arranged so that the direction of orientation in each of the molecularly oriented, linear, crystalline polyalkene laminae is the same. Thus, adhesives may be used as a means of sealing the panels of the package in the areas of the desired seal. The adhesively sealed package can be torn open in the same manner as the previously described heat sealed package. Although it is not esential to form the seal between the low density polythylene laminae in face-to-face contact in the instance of an adhesive seal, such an arrangement of panels ordinarily is to be preferred in order to take advantage of the high abrasion resistance of the linear, crystalline polyalkene lamina.

Packages, packets, or pouches of various structural configurations can be fabricated from the laminates. For example, the panels of the packages need not be made from separate laminated sheets; thus, a pouch-type package or packet can be made by folding over the laminate and sealing the side and top edges of package thus formed.

The individual laminae may also contain other elastomeric materials blended therein. Many hydrocarbon elastomers which are suitably compatible with the polymers described above include natural rubber, polyisobutylene, polybutadiene, and copolymers of butadiene, isoprene, and styrene, to name a few. The molecular weights of the elastomers may vary over a wide range, although blends with elastomers of molecular weight of about 40,000 and above are usually preferred for most applications utilizing the laminates of this invention. The amount of elastomer blended with the polyethylenes, of course, should be no greater than that which begins to destroys the essential characteristics of the laminates produced in accordance with this invention, primarily the characteristic of unidirectional tearability. Bulk compounding may be accomplished by conventional blending techniques.

What is claimed is:

1. The process whereby a low density polyethylene sheet is produced capable of being torn in a substantially straight line which comprises forming a sheet of a unidirectionally molecularly oriented, linear, crystalline polyalkene from a molten bulk of said polyalkene and, while the surface of said sheet poyalkene is thermally softened after formation thereof, forming a layer of low density polyethylene from a molten bulk thereof directly aigainst the thermally softened surface of said polyalkene sheet to fusion laminate said sheets together.

2. The process of claim 1 wherein the crystalline polyalkene is high density polyethylene.

3. The process of claim 1 wherein the crystalline polyalkene is isotactic polypropylene.

4. The process of claim 1 wherein the crystalline polyalkene is poly-alpha-butene.

References Cited by the Examiner
UNITED STATES PATENTS

| | | | |
|---|---|---|---|
| 1,826,155 | 10/31 | Thompson | 156—243 |
| 2,236,214 | 3/41 | Jones | 264—175 |
| 2,607,712 | 8/52 | Sturken. | |
| 2,834,395 | 5/58 | Russell et al. | 156—583 XR |
| 2,956,723 | 10/60 | Tritsch | 156—306 XR |

ALEXANDER WYMAN, *Primary Examiner.*

EARL M. BERGERT, *Examiner.*